US010252216B2

(12) United States Patent
Li et al.

(10) Patent No.: US 10,252,216 B2
(45) Date of Patent: Apr. 9, 2019

(54) REDUCTION OF AMINE EMISSIONS FROM AN AQUEOUS AMINE CARBON DIOXIDE CAPTURE SYSTEM USING CHARGED COLLOIDAL GAS APHRONS

(71) Applicant: UNIVERSITY OF KENTUCKY RESEARCH FOUNDATION, Lexington, KY (US)

(72) Inventors: Xiaobing Li, Lexington, KY (US); Jesse G. Thompson, Lexington, KY (US); Kunlei Liu, Lexington, KY (US)

(73) Assignee: UNIVERSITY OF KENTUCKY RESEARCH FOUNDATION, LEXINGTON, KY (US)

( * ) Notice: Subject to any disclaimer, the term of this patent is extended or adjusted under 35 U.S.C. 154(b) by 358 days.

(21) Appl. No.: 14/863,818

(22) Filed: Sep. 24, 2015

(65) Prior Publication Data
US 2016/0082384 A1   Mar. 24, 2016

Related U.S. Application Data

(60) Provisional application No. 62/054,448, filed on Sep. 24, 2014.

(51) Int. Cl.
*B01D 53/14* (2006.01)
*B01D 53/18* (2006.01)
(Continued)

(52) U.S. Cl.
CPC .......... *B01D 53/72* (2013.01); *B01D 53/1475* (2013.01); *B01D 53/58* (2013.01);
(Continued)

(58) Field of Classification Search
CPC .... B01D 2252/20484; B01D 2252/205; B01D 2252/608; B01D 2257/302;
(Continued)

(56) References Cited

U.S. PATENT DOCUMENTS 4,334,998 A   6/1982   Rios et al.
5,314,644 A   5/1994   Michelsen et al.
(Continued)

FOREIGN PATENT DOCUMENTS

JP   2001314724 A   11/2001
JP   2008045049 A   2/2008
(Continued)

OTHER PUBLICATIONS

Dicitonary.com definition of "disperse" accessed on Jun. 25, 2018 (Year: 2018).*
(Continued)

*Primary Examiner* — Cabrena Holecek
(74) *Attorney, Agent, or Firm* — King & Schickli, PLLC

(57) ABSTRACT

The present invention includes a system and process to reduce amine mist emissions (or MEA) from carbon capture systems using colloidal gas aphrons (CGA), and includes a method for separating and recovering an amine solvent (e.g., in the form of entrained droplets/mist and/or fine aerosol particles) from a carbon dioxide scrubbed flue gas stream exiting a carbon capture system (e.g., oil-fired power plants, coal-fired power plants, and/or natural gas combined cycle plants).

12 Claims, 15 Drawing Sheets

(51) Int. Cl.
*B01D 53/72* (2006.01)
*B01D 53/58* (2006.01)
*B01D 53/79* (2006.01)

(52) U.S. Cl.
CPC ........ *B01D 53/79* (2013.01); *B01D 2252/205* (2013.01); *B01D 2252/20484* (2013.01); *B01D 2252/608* (2013.01); *B01D 2257/302* (2013.01); *B01D 2257/40* (2013.01); *B01D 2257/406* (2013.01); *B01D 2257/504* (2013.01); *B01D 2257/70* (2013.01); *B01D 2258/0283* (2013.01); *Y02C 10/06* (2013.01)

(58) Field of Classification Search
CPC .......... B01D 2257/40; B01D 2257/406; B01D 2257/504; B01D 2257/70; B01D 2258/0283; B01D 53/1475; B01D 53/58; B01D 53/72; B01D 53/79; Y02C 10/06
See application file for complete search history.

(56) References Cited

U.S. PATENT DOCUMENTS

| | | | |
|---|---|---|---|
| 6,022,727 | A | 2/2000 | Worden et al. |
| 6,645,450 | B2 | 11/2003 | Stoltz et al. |
| 7,037,881 | B2 | 5/2006 | Growcock et al. |
| 7,628,912 | B2 | 12/2009 | Yamasaki et al. |
| 8,221,528 | B2 | 7/2012 | Tonkovich et al. |
| 8,512,460 | B2 | 8/2013 | Moniwa et al. |
| 8,585,902 | B2 | 11/2013 | Sarkar et al. |
| 8,840,704 | B2 | 9/2014 | Shoji et al. |
| 2008/0199379 | A1 | 8/2008 | Bogenstatter et al. |
| 2009/0050550 | A1 | 2/2009 | Matsuura et al. |
| 2009/0107111 | A1 | 4/2009 | Oliver |
| 2011/0174156 | A1* | 7/2011 | Saunders ........... B01D 53/1475 95/46 |
| 2013/0092626 | A1 | 4/2013 | Zimmerman et al. |
| 2013/0101493 | A1 | 4/2013 | Okabe et al. |
| 2014/0187826 | A1 | 7/2014 | Worden et al. |
| 2014/0305302 | A1* | 10/2014 | Kwon .................... B01J 20/048 95/139 |

FOREIGN PATENT DOCUMENTS

| | | |
|---|---|---|
| JP | 2010110681 A | 5/2010 |
| JP | 2011000581 A | 1/2011 |
| JP | 2013017982 A | 1/2013 |
| WO | 2013088391 A1 | 6/2013 |

OTHER PUBLICATIONS

Evermesh Pad Mist Eliminator brochure; Evergreen Technologies Pvt. Ltd., Mumbai, India 2005.
English machine translation of JP2001314724A.
English machine translation of JP2008045049A.
English machine translation of JP2010110681A.
English machine translation of JP2011000581A.
English machine translation of JP2013017982.
Thompson, Jesse G. Reducing amine aerosol emissions from carbon capture systems using colloidal gas aprons. Science Direct. Energy Procedia 63 (2014) 951-956.

* cited by examiner

REDUCTION OF AMINE EMISSIONS FROM AN AQUEOUS AMINE CARBON DIOXIDE CAPTURE SYSTEM USING CHARGED COLLOIDAL GAS APHRONS

RELATED APPLICATIONS

This application claims priority to U.S. Provisional Patent Application 62/054,448, filed Sep. 24, 2014, which is hereby incorporated by reference in its entirety.

FIELD OF THE INVENTION

The present invention is directed to a system and methods of use of such for colloidal gas aphrons (CGAs) to assist in the removal of misted amine solvents from a carbon capture flue gas in order to provide a cleaner emitted gas with less negative environmental impact and increased recovery of solvent.

BACKGROUND

The capture and control of carbon dioxide ($CO_2$) from major industries such as cement and steel mills, and coal fired power plants is considered the most effective solution in tackling climate change caused by $CO_2$ accumulation in the atmosphere. Among the common capture approaches, chemical absorption and desorption is perhaps the most promising option for separating $CO_2$ from fossil-fuel flue gas due to its simple operation, high absorption efficiency, cost-effectiveness and technological maturity and be emitted from the system. These entrained droplets, or mist, can lead to significant solvent losses during the $CO_2$ capture process and [Fulk et al., Energy Procedia 2013; 37:1706-19]. From a process and economic standpoint it is important to reduce or eliminate amine solvent emissions from the outlet gas streams. Reducing or eliminating solvent emissions can have several important benefits including: (a) reduced loss of valuable solvent, (b) elimination of fugitive emission, and (c) reduction in negative environmental impacts [Austrheim et al., Chem Eng J 2008; 138:95-102].

SUMMARY OF THE INVENTION

The present invention includes a system and process to reduce amine mist emissions (such as monoethanolamine (MEA) or ammonia) from carbon capture systems using colloidal gas aphrons (CGA), and includes a method for separating and recovering an amine solvent (e.g., in the form of entrained droplets/mist and/or fine aerosol particles) from a carbon dioxide scrubbed flue gas stream exiting a carbon capture system (e.g., oil-fired power plants, coal-fired power plants, and/or natural gas combined cycle plants).

The system of the present invention may be generally described as a CGA generation (i.e. micro bubble) and capture apparatus comprising: (a) a disperser (e.g., a homogenizer driven by a high-speed electric motor) inside a CGA generating cell, (b) a pump (e.g., a peristaltic pump), and (c) a CGA capture cell.

The capture process of the present invention may operate in a counter-current fashion wherein a flue gas (containing carbon dioxide) enters the capture cell at the bottom through a tube and contacts the CGA micro bubbles in the capture cell. The CGA micro bubbles (i.e. <100 µm) consist of double layered surfactant molecules with a thin surfactant film encapsulating an air core, thereby allowing for adsorption selectivity. Amine is captured and removed from the flue gas by various mechanisms (e.g., electrical forces, dissolution, and/or diffusion). Additional (or secondary) amine removal may be accomplished by addition of a secondary entrained liquid trap downstream from the capture cell.

The method for separating and recovering an amine solvent from a flue gas may generally be described as including the steps of: (1) selecting/adjusting a desired adsorption selectivity of CGAs, (2) generating the CGA from distilled water and a surfactant mixed inside a stirring cell, (3) pumping the CGA into a capture cell, (4) pumping the flue gas into the capture cell, (5) contacting the CGA with the flue gas in the capture cell, and (6) removing the amine solvent from the flue gas. Adsorption selectivity can be adjusted by changing the surfactant used (e.g., cationic, anionic, or non-ionic) and its surface charge (positive, negative, or neutral). As the amine solvent comes into contact with the charged-CGA, it is held onto the surface of the bubbles by electrostatic forces/attachment.

Accordingly, the system and method of the present invention may (a) reduce loss of valuable amine solvent, (b) reduce total emissions, (i.e. MEA and ammonia emissions can be reduced by about 27 to about 87% of reference levels), and (c) reduce the negative environmental impacts from amines escaping into the environment.

The present invention provides, in part, for a system for removing amine solvents from a carbon capture flue gas comprising a generator cell, a capture cell and an eliminator cell. The generator cell may comprise a stirrer and a measure of surfactant in a solution to generate colloidal gas aphrons (CGAs). The capture cell may comprise a medium, an inlet for CGAs and an outlet for flue gas at a first end of the capture cell and an outlet for CGAs and an inlet for flue gas at a second opposite end of the capture cell. The eliminator cell may comprise a wire mesh filter and an inlet port to receive CGAs from the outlet for CGAs from the capture cell.

The surfactant of the system may be selected from the group consisting of SDS (sodium dodecyl sulfate), SDBS (sodium dodecyl benzene sulfonate), AOT (sodium bis (2-ethyl hexyl) sulfosuccinate), SLS (sodium lauryl sulfate), potassium oleate, Aerosol OT, LUX flakes, Benzethonium chloride, or mixtures thereof. The surfactant may be sodium dodecylbenzene sulfonate (SDBS) and/or hexadecyltrimethylammonium bromide (CTMAB). The surfactant may be present in the generator cell at a concentration of between 0.1 and 10.0 g/L, such as at around 1.5 g/L.

The capture cell may be maintained at a temperature of between 10-90° C., or at between 25-45° C. 11. The medium of the capture cell may comprise a solution with surfactant, or provided with CGAs. The capture cell may comprise a solution with SDBS CGAs. The capture cell provides for flow of flue gas to be counter to or opposite that of flow of CGAs from the inlet for CGAs.

Within the generator cell, the stirrer may rotate at between 2000 and 20000 revolutions per minute in a solution comprising the surfactant to generate CGAs. In certain embodiments, the stirrer may rotate at about 18000 revolutions per minute (rpm) to generate CGAs.

The present invention also provide in part for a method for removing misted amine solvents from carbon capture flue gas comprising counter-flowing a flue gas against a flow of CGAs in a capture cell, wherein misted amine solvents present in the flue gas are captured by the CGAs.

The CGAs may have an average diameter of 100 µm or less. The CGAs may comprise a surfactant selected from the group consisting of SDS (sodium dodecyl sulfate), SDBS (sodium dodecyl benzene sulfate), AOT (sodium bis (2-ethyl hexyl)sulfosuccinate), SLS (sodium lauryl sulfate), potassium oleate, Aerosol OT, LUX flakes, Benzethonium chloride, or mixtures thereof. In certain embodiments, the surfactant is SDBS and/or CTMAB.

The CGAs may be pumped into the capture cell from a generator cell. The generator cell may comprise a spinner rotating at between 2000 and 20000 rpm in a surfactant solution of water and a surfactant. In certain embodiments, the spinner rotates around 18000 rpm. The surfactant in the generator cell comprises part of a solution and may be present at a concentration of between 0.1-10.o g/L. The solution may further comprise water. In certain embodiments, the surfactant is at a concentration of between 0.5 and 2.0 g/L.

The capture cell may be maintained at a temperature of between 10 and 90° C. In certain embodiments, the capture cell is maintained at a temperature of between 25 and 45° C. The capture cell may further contain a volume of a medium, such as a solution or a gas. The medium may comprise SDBS derived CGAs.

BRIEF DESCRIPTION OF THE DRAWINGS

FIG. 4 B shows a graphical cross-section of a CGA.

DETAILED DESCRIPTION

Figure 1:
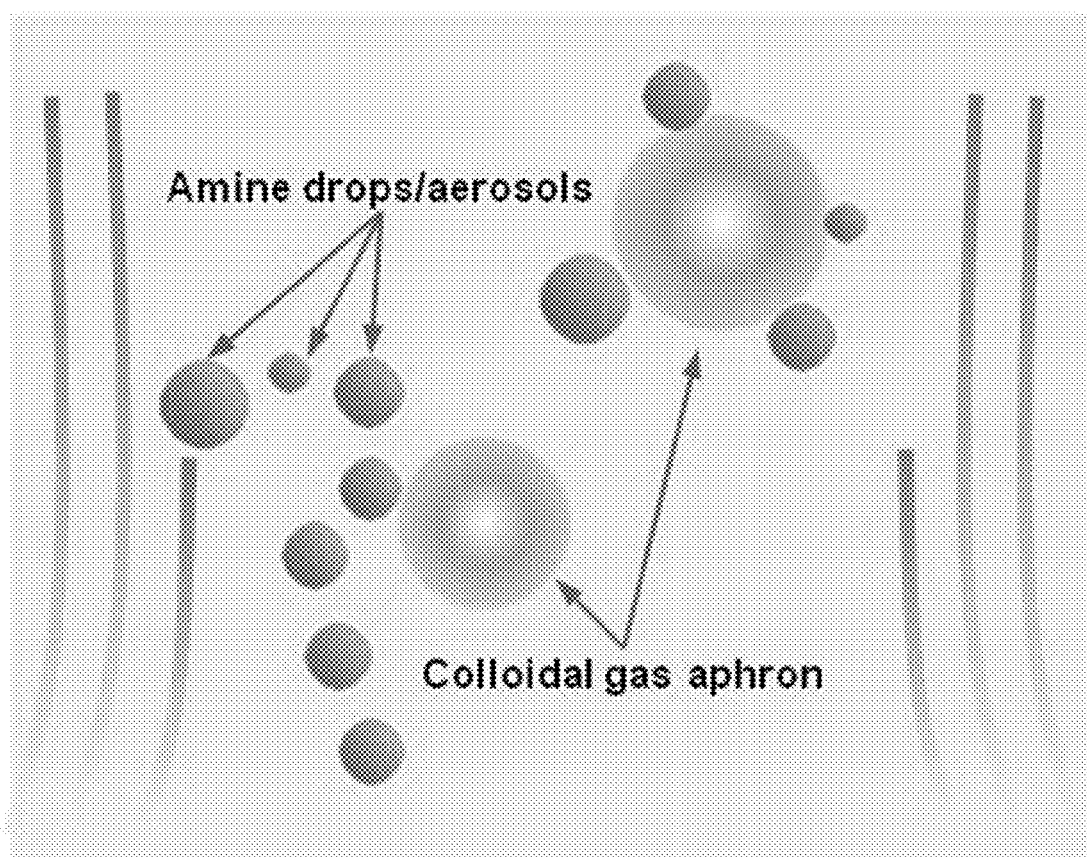
FIG. 1 shows a graphical representation of the electrostatic interaction between the gas phase amine drops/aerosols (blue) and the CGA micro bubbles (gray) during the capture process.

The present invention provides a system and method of use thereof for reducing amine mist emissions (such as MEA and ammonia) from carbon capture systems through colloidal gas aphrons (CGAs) which comprises a surfactant-based separation technique. The invention provides for a system and method for separating and/or recovering amine solvents in the form of entrained droplets/mist and/or fine aerosol particles from a $CO_2$ scrubbed flue gas stream exiting a carbon capture system. Capturing and reducing amine emissions can provide the benefits of reduced loss of amine solvent, reduced total system emissions and reduced negative environmental impact of otherwise escaped amines.

Colloidal gas aphrons (CGAs) comprise micro bubbles of double layered surfactant molecules. The double layer may comprises surfactant molecules in a head-tail-tail-head arrangement to form a surfactant bilayer. Within the core created by the double layers, a further layer of surfactant may be present that isolates an air core within the microbubble. Between the double layer and the internal further layer of surfactant may comprise a space filled with water.

Amine solvents present in a $CO_2$ scrubbed flue gas stream can be removed by the CGA following contact. The CGA may provide electrical attraction, dissolution and/or diffusion to the gas phase amine drops/aerosols present in the stream. The amine may be captured or held to the surface of the CGA.

The CGAs of the present invention may be between 10 and 300 μm in width. The CGAs may be of 100 μm or less in width. Those skilled in the art will appreciate that the CGAs will adopt a primarily spherical shape. A CGA may comprise a diameter of 100 μm or less. The CGAs collectively present may comprise an average diameter of 100 μm of less.

The system and method of the present invention may comprise a disperser inside a stirring cell, a peristaltic pump and a capture cell. A disperser may comprise a homogenizer driven by a motor, such as a high-speed motor. The motor may utilize electrical power to operate.

CGAs of the present invention may be produced through stirring a measured amount of surfactant with water. The surfactant can be selected from SDS (sodium dodecyl sulfate), SDBS (sodium dodecyl benzene sulfate), AOT (sodium bis (2-ethyl hexyl) sulfosuccinate), SLS (sodium lauryl sulfate), Potassium oleate, Aerosol OT, LUX flakes, Benzethonium chloride, or mixtures thereof. The surfactant may comprise sodium dodecylbenzenesulfonate (SDBS) and/or heaxdecyltrimethylammonium bromide (CTMAB) or mixtures thereof. The surfactant may comprise an anionic, cationic and/or non-ionic surfactant or mixtures thereof. Those skilled in the art will appreciate that distilled water may be preferred. The CGA may be generated at varying rates of stirring the measured surfactant.

The CGA may be generated under varying conditions. Stirring speed provides a parameter to adjust for CGA production. For example, as described herein slower speeds prevent CGA formation, yet speed can be increased such that large unstable bubbles and/or foaming occurs. A stirring rate of between about 2000 and 20000 rpm may be utilized to generate CGAs. The stirring rate may be between around 12000 rpm and 24000 rpm may be utilized. The stirring rate may be around 18000 rpm.

The amount or concentration of surfactant may further affect CGA generation. Surfactant can be present in a CGA generator in a concentration of between about 0.1 g/L to 10.0 g/L. Over-production of CGA provides for overlap between CGA and less surface area exposed to flue gas within the capture cell or too rapid floating with a reduced contact time. Increased concentrations of surfactant may lead to too large a bubble and reduced amine removal. The concentration of surfactant may be less than 2.5 g/L, such as around 1.5 g/L, 0.5 g/L, 1.0 g/L.

Following production or generation, CGAs can be pumped into a capture cell to scrub flue gas of amines. CGAs may be pumped into a capture cell in a direction opposite that of the flue gas. The flue gas may be $CO_2$ scrubbed prior to entering the capture cell. As CGAs flow against the flue gas, misted amines are removed from the flue gas by contact with the CGAs. A flue gas may enter a capture cell through a port at one end, such as the bottom of the capture cell and flow toward the other end, such as the top, whereas CGAs may be introduced to flow in the opposite direction, such that the CGAs contact misted amines in the flue gas in a counter-current fashion. Those skilled in the art will appreciate that counter-current flow between the CGAs and the flue gas provides for enhanced collision and capture of misted amines. Those skilled in the art will also appreciate that adjusting flow rates of CGAs and/or flue gas within the capture cell can further affect amine capture/scrubbing.

The flow rates of the flue gas and the CGA can be altered depending on the volume of the capture chamber, the mean size of the CGA and the mean size of amine droplets/mist and the velocity as they move against each other. Flow can be controlled entering the capture chamber through a variable pump, such as a peristaltic pump placed before the entry of the flue gas and/or CGA into the capture chamber. The flow pattern of flue gas in the capturing cell may be of a layer flow pattern. In order to improve the collision efficiency, the size of the CGA bubble should be approached the size of ammonia droplet. When the Reynolds number of the flow field is less than one (Re<1), the collision efficiency, Pas, is as follows:

$$P_{as} = \sin^2\left[2\arctan\exp\left(\frac{-3U_b t_i}{2R_b(R_b/R_p + 1)}\right)\right]$$

Figure 12:
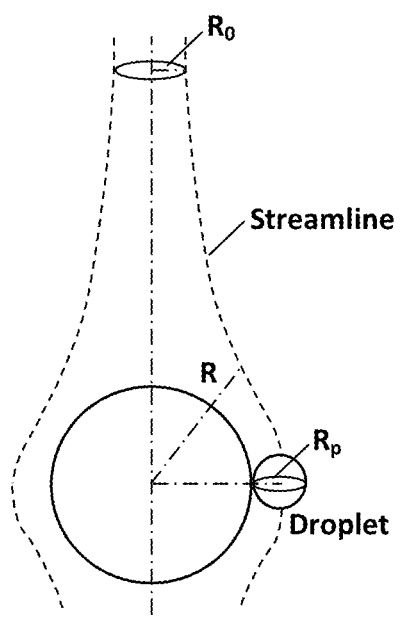
FIG. 12 shows a schematic diagram of streamline collision between amine droplet and CGA.
Figure 14:
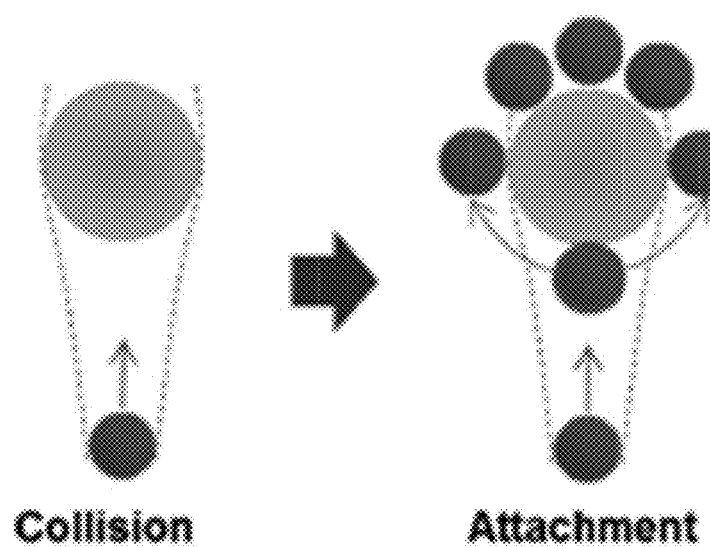
FIG. 14 shows potential CGA attachment and capture process.

When the Reynolds number of the flow field is between one and two hundred (1<Re<200), the collision efficiency, Pas is as follows:

$$P_{as} = \sin^2\left[2\arctan\exp\left(\frac{-U_b t_i(45 + 8Re_b^{0.72})}{30R_b(R_b/R_p + 1)}\right)\right]$$

Where $U_b$ is the rising terminal velocity of the CGA bubble, $R_p$ is the diameter of droplet, $R_b$ is the diameter of the bubble, $t_i$ is the induction time. FIG. 12 shows a schematic for streamlining collision between an amine droplet and a CGA bubble and FIG. 14 shows the potential CGA attachment and capture process The CGAs of the present invention can remove amine from a flue gas. The amines may comprise amines as a droplet or mist within flue gas, such as MEA or ammonia. As set forth in the Examples described herein, the system and methods of using such provide for reduced amine presence from a flue gas. The CGAs may provide for reducing amines from a flue gas by between 10 and 99%. Those skilled in the art will appreciate that utilizing varying surfactants, as well as other parameters such as counter-current flow rates, CGA diameter etc., may permit for amine reduction to be further controlled.

As further set forth in the working examples, certain parameters may alter amine removal, including $CO_2$ present in the flue gas, temperature, flow rate, pressure, pH and combinations thereof. Scrubbing $CO_2$ from a flue gas may alter amine reduction, although amine reduction can occur at any concentration of CO2. The flue gas may comprise between 0 and 20% $CO_2$. Temperature of the capture cell may alter amine removal. For example, higher temperatures allow for increased kinetic energy and consequently higher collision probability. However, over certain temperatures, MEA will increase in vapor pressure such that it is evaporated from a liquid phase. The temperature of the capture cell may range between around 10 and 90° C. The temperature may be between 25-45° C. The pressure of the capture chamber may be an ambient pressure, with +/− around 1-2 bar tolerable for effective amine removal. Volume of the capture chamber should be tailored relative to the volume and/or rate of flow of flue gas in the chamber such that CGA can effectively collide or contact misted amines in the flue gas.

The medium of the capture cell may also alter amine removal from the flue gas. As described herein, a medium of anionic CGA may increase amine removal by hydrolyzing or otherwise binding the amine. A medium of surfactant alone or water may not increase amine capture. A cationic medium may adsorb though collision or electrostatic attachment.

A further parameter for controlling amine removal is the presence of ammonia in the flue gas. As is known in the art, ammonia may be utilized for $CO_2$ scrubbing, and thus may be present in a scrubbed flue gas. As demonstrated herein, the CGA can reduce the emission concentration of ammonia from a flue gas.

Following MEA capture, the CGAs may leave the capture cell and flow to an elimination chamber. The elimination chamber may use impingement to remove CGA droplets/bubbles from the exit gas stream from the capture chamber. The surfactant/CGA can be recovered and returned to the generation cell by pumping the liquid recovered in the elimination chamber to the generation chamber. The elimination chamber may comprise a filter or screen through which CGA and amine-trapped CGA cannot pass, thereby allowing only flue gas with a reduced amine level to pass through. The filter or screen may comprise a layer or multiple layers of mesh, such as a metal wire mesh, that The filter or screen may comprise a wire mist eliminator (e.g., Evergreen Technologies Evermesh Mist Eliminator wwww-.evergreenindia.com/mist-eliminators).

EXAMPLES

In the $CO_2$ capture process from coal-derived flue gas where amine solvents are used, the flue gas can entrain small liquid droplets into the gas stream leading to emission of the amine solvent. The entrained drops, or mist, will lead to high solvent losses and cause decreased $CO_2$ capture performance. In order to reduce the emissions of the fine amine droplets from $CO_2$ absorber, a novel method using charged colloidal gas aphron (CGA) generated by an anionic surfactant was developed. The CGA absorption process for MEA emission reduction was optimized by investigating the surfactant concentration, stirring speed of the CGA generator, and capture temperature. The results show a significant reduction of MEA emissions of over 50% in the flue gas stream exiting the absorber column of a pilot scale $CO_2$ capture unit.

The control and capture of $CO_2$ from major industries such as power plants, cement and steel mills is considered as the most effective solution in tackling $CO_2$ induced climate change. Among the various capture approaches, chemical absorption and desorption is a promising option for separating $CO_2$ from fossil-fuel derived flue gas due to its relatively simple operation, high absorption efficiency, cost-effective and maturity.

In a process where gas and liquid come into contact such as a $CO_2$ capture absorber column, the gas can entrain fine liquid droplets into the gas stream. These entrained droplets, or mist, can cause secondary environmental impact and increase solvent loss during the $CO_2$ capture process [Fulk et al., Energy Procedia 37 (2013) 1706-1719]. Amine mist can form from micron and submicron liquid droplets or solid particulate matter produced during coal combustion and downstream gas scrubbing. The fine particles or aerosols serve as nucleation sites for the amine to condense, and ultimately are emitted from the absorber column.

It is important from a process and economic standpoint to reduce or eliminate the emission of amine solvent as droplets in the outlet gas streams. Mist emission reduction or elimination can have several important benefits including: (a) reduced loss of valuable solvent, (b) elimination of fugitive emission, and (c) reduction in negative environmental impacts [Austrheim et al., Chem. Eng. J. 138 (2008) 95-102]. The size and amount of aerosol particles or mist droplets will determine the selection and design of the optimal emission reduction system. A droplets formation mechanism can normally be described by three basic routes: mechanical action via bursting of gas bubbles, condensation, or chemical reaction. Mist droplets generated by chemical reaction are in the sub-micron range, droplets generated by mechanical means are usually over 5-10 µm in diameter, while droplets generated by condensation are usually above 50 µm [McNulty et al., Chem. Eng. Prog. 83 (1987) 48-55].

There are several commonly used mist eliminators, such as vane mist eliminator, mesh mist eliminator, swirl mist eliminator and cyclone systems [Al-Dughaither et al., J. Saudi Chem. Soc. 14 (2010) 331-339]. Presently, a mist elimination process has not yet been specifically developed for incorporation into carbon capture systems. One innovative approach to reduce amine mist emissions from carbon capture system is using charged colloidal gas aphrons (CGA), a surfactant-based separation technique [Austrheim et al., Fuel 87 (2008) 1281-1288]. The CGA micro bubbles have a double layer of surfactant molecules with a thin surfactant film encapsulating the air core [Sebba, J. Colloid Inter. Sci. 40 (1972) 468-474; Save et al., Chem. Eng. Commun. 127 (1994) 35-54; Jauregi et al., AIChE J. 46 (2000) 24-36]. The adsorption selectivity of the CGA can be adjusted by changing the surfactant used, such as cationic, anionic or non-ionic, with the outer surface of the micro-bubble as positively, negatively or non-charged respectively, to which oppositely or non-charged molecules will adsorb onto the surface of micro-bubble [Dai et al., J. Colloid Inter. Sci. 261 (2003) 360-365].

Due to the unique characteristics, including large surface area, low viscosity and high stability, the CGA has attracted increasing attention[Sadeghialiabadi et al., Colloid Surf. A-Physicochem. Eng. Asp. 471 (2015) 170-177; Zhao et al., Colloid Surf. A-Physicochem. Eng. Asp. 348 (2009) 93-99]. The application of CGA is becoming more and more widespread because of these characteristics, CGA have been used in biological separation and protein recovery, flotation separation processes, wastewater treatment and water purification, drilling fluids and firefighting and the removal of toxic wastes from soil [Spigno et al., Food Bioprod. Process. 94 (2015) 434-442; Dermiki et al., Sep. Purif. Technol. 65 (2009) 54-64; Jauregi et al., Chem. Eng. J. 65 (1997) 1-11; Jarudilokkul et al., Sep. Purif. Technol. 35 (2004) 23-29; Cilliers et al., Miner. Eng. 9 (1996) 235-241; Waters et al., Miner. Eng. 21 (2008) 918-923; Hashim et al., Bioresource Technol. 64 (1998) 199-204; Watcharasing et al., Sep. Purif. Technol. 62 (2008) 118-127; Growcock et al., SPE Drill Complet. 22 (2007) 74-80; Roy et al., J. Hazard. Mater. 42 (1995) 247-263; Mansur et al., Sep. Purif. Technol. 48 (2005) 71-77; Molaei et al., Adv. Colloid Interface Sci. 216 (2015) 36-54; Frimpong et al., Chem. Eng. Res. Des. 6 (2013) 963-969]. However, the application of CGA for amine mist emission reduction has not yet been explored.

The capture and removal of amine from a gas stream can potentially occur through various mechanism including electrical forces, dissolution and/or diffusion. The electrostatic interactions of the amine to the charged CGA are represented in FIG. 1. The droplet or aerosol particle contacts the charged CGA micro bubble and is captured and held on the bubble surface by the electrostatic forces. The main objective of this research was to investigate the performance of a CGA system in reducing MEA mist emissions from a pilot scale $CO_2$ capture process using coal combustion flue gas.

$CO_2$ Capture Pilot Operating Conditions

A 0.1 MWth pilot-scale $CO_2$ capture facility with a coal-fired flue gas generator (FGG) was utilized. The $CO_2$ capture facility consists of a 7.3 m (24 ft) tall by 10 cm (4") ID scrubber with a 25.4 cm (10") ID solvent recovery column downstream, a 4.3 m (14-ft) tall stainless steel stripper, and a condenser for solvent recovery in the stripper exhaust. The FGG is a coal combustion system designed to deliver flue gas to the CO2 capture pilot plant with a thermal design capacity of 200,000 Btu/hr. Flue gas exiting the combustor enters a high-temperature cyclone to remove particulate matter. After the cyclone, the SO2 concentration is lowered in the gas stream with a wet flue gas desulphurization (WFGD) unit. Additional pilot information can be found in Frimpong et al. [Jauregi et al., Chem. Eng. J. 65 (1997) 1-11]. The amine solvent used in the current test campaign was aqueous 30% (wt) monoethanolamine (MEA). During the course of the MEA emission and CGA capture and elimination experiments, parametric solvent testing was performed in the $CO_2$ pilot unit. Among the main system parameters adjusted during the parametric testing was the inlet CO2 concentration in the incoming flue gas. Normally, the output from the FGG is close to 14% $CO_2$ as it enters the absorber column. During several testing days the $CO_2$ level was decreased by doping to 5% $CO_2$ with high purity nitrogen (Scott Gross Company Inc., Lexington Ky.) or air, or increased to 19% with pure $CO_2$ to study the effect of inlet $CO_2$ concentration on energy demand for solvent regeneration. Table 1 describes the changes to the flue gas $SO_2$ and oxygen levels during parametric testing.

TABLE 1

| Campaign | $O_2$ | $SO_2$ |
|---|---|---|
| 14% $CO_2$ | 8% | ~100 ppm |
| 5% $CO_2$ with $N_2$ doping | 3.7% | 68 ppm |
| 5% $CO_2$ with air doping | 13.5% | 67 ppm |

2.2 CGA Capture and Elimination System

Figure 2:
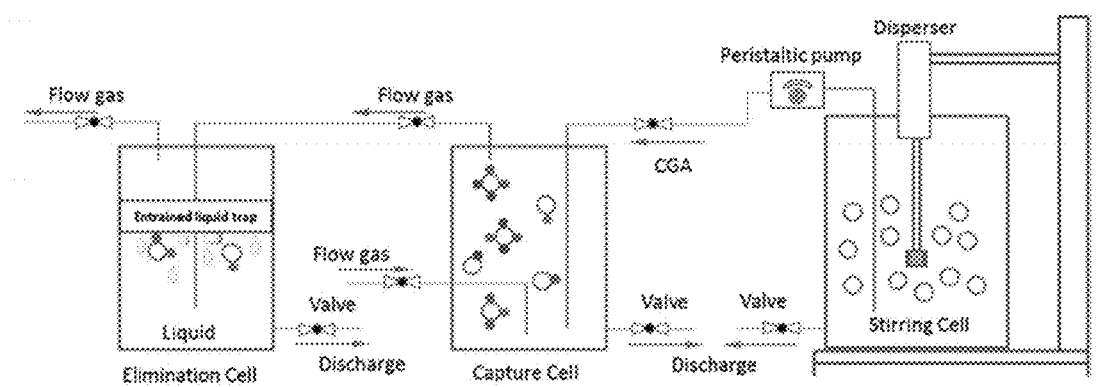
FIG. 2 shows a schematic of the CGA capture experimental apparatus.

The CGA generation and capture apparatus included a disperser inside a generation cell, a peristaltic pump and a capture cell. The disperser consists of a homogenizer (model: Pow Gen 500, 115V) and a saw tooth generator (model: 10°-195 mm), driven by a high-speed electric motor capable of speeds up to 24,000 rpm. The generation cell is made of acrylic with an internal diameter of 8 inches and a height of 10 inches. The capture cell is also made of acrylic with a diameter of 8 inches and height of 12 inches. Sodium dodecylbenzenesulfonate (SDBS, technical grade, Buchs Inc, Switzerland) and hexadecyltrimethylammonium bromide (CTMAB, +99%, Acros Organics, New Jersey, USA) were used to generated CGA. SDBS is a twelve-carbon straight chain, anionic surfactant that is commercially available, biodegradable and relatively nontoxic. CTMAB is a sixteen-carbon straight chain cationic surfactant commonly used as an antiseptic agent, and therefore has some ecological toxicity. The CGA were generated with 1 L distilled water and a measured amount of the surfactant when the stirring speed exceeded 6000 rpm. The CGA can be pumped into the capture cell by a peristaltic pump through an emulsion tube. The capture process works in a counter-current fashion in the capture cell, where the flue gas was introduced at the bottom through a tube with a diameter of ¼ inches. The flue gas exits the elimination cell and travels through an entrained liquid trap before entering the gas sampling apparatus. The temperature of the capture cell was adjusted by placing it into a temperature controlled water bath. The CGA experimental apparatus schematic is shown in FIG. 2.

2.3 Methods

The size distributions of CGA in the generated solutions were measured with a laser particle size analyzer (Model: BT-9300HT, Dandong Bettersize instruments Ltd). The viscosity of CGA solutions were measured with a viscometer (Model: SNB-1, Shanghai Nirun intelligent science & technology co., ltd). The morphology of CGA was obtained with an optical microscope (Model: Carl Zeiss, Axio Scope.A1, Germany). The stability of CGA can be evaluated by measuring the half-life of the dispersion, which is defined as the time required for half the initial volume of liquid use to generate the CGA to drain from a vessel [US EPA, Procedure for collection and analysis of ammonia in stationary sources, Conditional Test Method (CTM-027), draft 8/14/97]. MEA and ammonia emissions were measured after the $CO_2$ absorber column in the flue gas exit line using US EPA CTM-027 and adapted to fit the CAER pilot plant [Roy et al., J. Hazard. Mater. 38 (1994) 127-144]. The gas sampling apparatus consisted of a sampling console with a dry gas pump connected to a 4-impinger sampling train in an ice bath containing 0.05 M sulfuric acid, along with an inline binder-free quartz filter to keep coal fly ash from entering the 15 mpinge train. Sulfuric acid is used to absorb the basic ammonia and MEA emitted in the gas stream exiting the absorber column. The sampling lines were not heated (ambient conditions) during the sample collection period. The MEA emission reduction efficiency of the CGA capture and elimination system was evaluated during a 30% (wt) MEA solvent test campaign in the pilot $CO_2$ capture unit. During the evaluation period, parametric solvent testing was performed in parallel resulting in daily variations in the MEA emission level (measured in ppmV). During CGA testing, a control (reference) gas sample was collected from a sampling port located before the CGA capture and elimination apparatus. At the same time, a gas sample was collected after the CGA capture and elimination apparatus. The reference sample was used to evaluate the reduction in emissions and to normalize the results on a 100 point scale (representing % MEA emission reduction) for comparison purposes.

Field and lab blanks were also collected in stand-alone impingers with 0.05 M sulfuric acid. The lab and field blanks samples were used to account for any interference from ambient MEA in the pilot plant or lab areas. The lab blank sample was maintained away from the pilot area to serve as a negative control for the field blank. The field blanks were placed inside an ice filled box alongside the 16 mpinge train near the gas sampling equipment on the pilot $CO_2$ capture system. The MEA levels in all lab and field blanks were below the detection limit.

Collected impinger sulfuric acid samples were diluted 10 times and analyzed by cation ion chromatography using a Dionex ICS-3000 system (Dionex-Thermo Scientific Sunnyvale, Calif.) with an autosampler. The cation IC system consisted of a CSRS 300 suppressor, EGC III MSA (methanesulfonic acid) eluent generator, IonPac CS17 analytical column and a CG17 guard column operated at 30° C. The conductivity detector was maintained at 35° C. with a sample injection volume of 20 μL. An isocratic mobile phase of methanesulfonic acid (2.5 mM) at a flow rate of 0.8 mL/min was used. MEA quantitation was performed by creating a calibration curve from pure MEA (+99%, Alfa Aesar, Ward Hill, Mass.) standards. Ammonia quantitation used a calibration curve made from a stock ammonium ($NH_4+$) solution (Environmental Express, Charleston, S.C.)

3 Results and Discussion 3.1 Characterization of CGA

Figure 3:
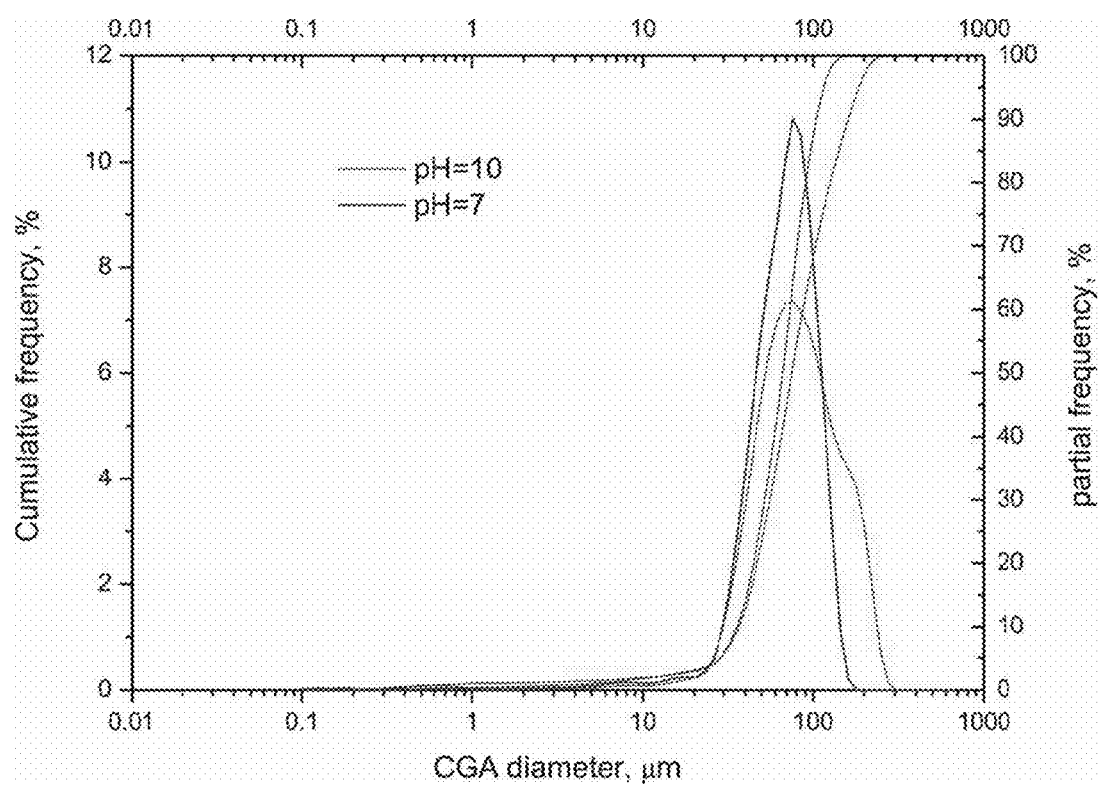
FIG. 3 shows micro bubble size distribution with encapsulated film of the aqueous colloidal gas aphrons.
Figure 4A:
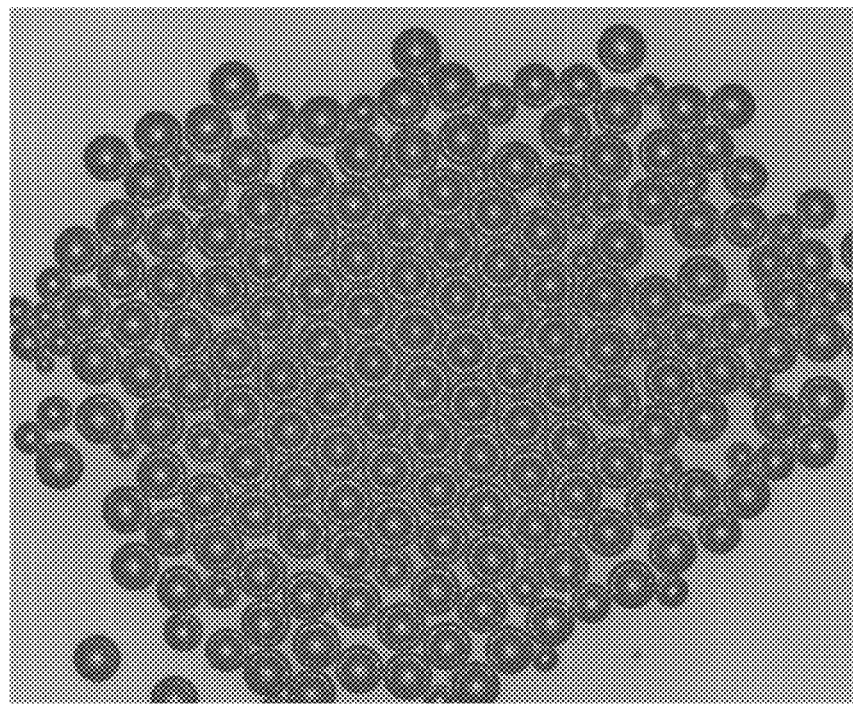
FIG. 4 A shows optical microscope image (100×) of the aqueous colloidal gas aphrons.
Figure 4B:
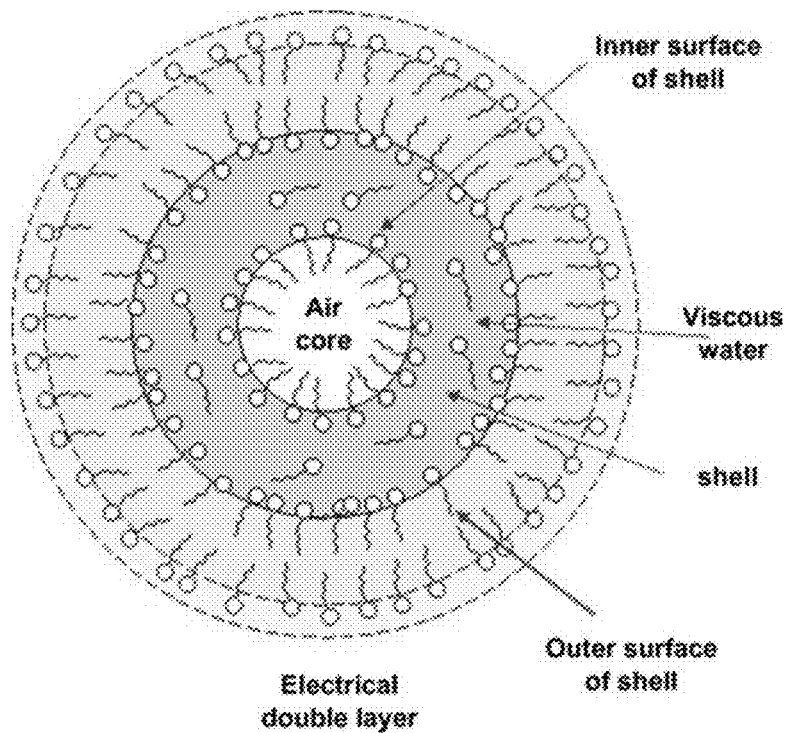

In order to evaluate the CGA-based removal efficiency of MEA at varying pH in the capture cell, the effect of pH on the mean size, viscosity and half-life was determined by adjusting the solution to a pH of 10.14 using 1 M HCl, and then from 10 to a pH of 7.04, and then to pH of 2.99 using 1 M NaOH. The properties of the SDBS generated charged CGA are shown in Table 2. The pH value had no significant effect on the mean size, stability and viscosity properties of charged bubbles. In the 3-10 pH range, the SDBS surfactant in solution is present mainly in the ionic form (pKa=2.554) [Dean, Handbook of Organic Chemistry, McGraw-Hill Book Company, New York, N.Y., 1987]. The electrostatic interactions of the ionic form of the surfactant will contribute the stability of CGA, and is consistent with observations reported by Jauregi, et al. [Liu et al., Chem. Eng. Sci. 75 (2012) 298-308]. The diameter and size distribution of charged CGA at pH 7 and 10 are presented in FIG. 3. A 100× optical microscope image of the CGA is shown in FIG. 4A (FIG. 4B shows a graphical cross-section of a CG). The mean diameter of CGA at pH=7 is 83.74 μm, with the proportion of bubbles smaller than 9.98 μm of only 1.86%. The proportion of bubbles smaller than 76.33 μm is 43.68%. The measured half-life of CGA reached close to 180 sec. and can be kept dispersed under low stirring conditions (around 500 rpm) and pumped by means of a peristaltic pump without breaking. The shear viscosity of the CGA solution was measured at room temperature. The results show that the viscosity of CGA solution is low and that it has flowability and can separate easily from the bulk liquid phase.

TABLE 2

| Sample | pH value | Mean diameter (μm) | Viscosity (mPas) | Half-life (seconds) |
|---|---|---|---|---|
| 1 | 2.99 | 81.07 | 0.87 | 182 |
| 2 | 7.04 | 83.74 | 0.85 | 183 |
| 3 | 10.14 | 73.73 | 0.83 | 179 |

Figure 5:
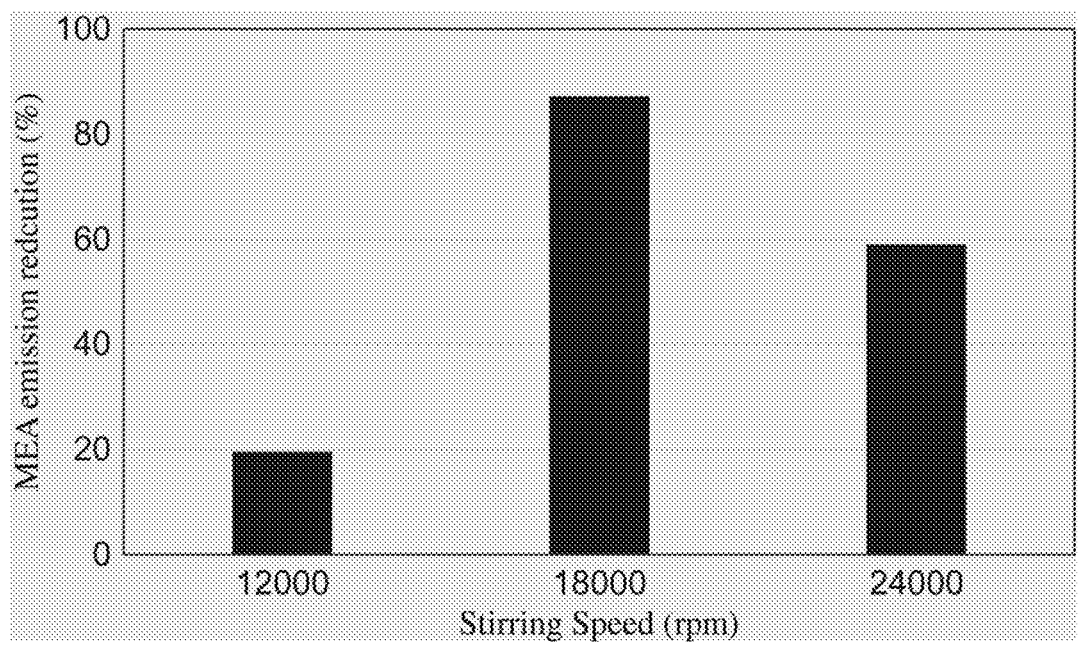
FIG. 5 shows the effect of stirring speed on MEA emission reduction.

3.2 Removal of MEA Mist from Gas Emissions Generated in a CO2 Capture System 3.2.1 Effect of Stirring Speed During CGA Generation The stirring speed of the surfactant solution is an important parameter during CGA generation. Slower speeds may not generate a suitable amount of micro bubbles, while higher speeds may lead to large, unstable bubbles and excessive foaming. This phenomenon can be ascribed to variable energy input, with a higher energy input at higher stirring speed resulting in an increased bubble surface energy by increasing the surface area leading to smaller bubble sizes. Owing to their smaller size, the CGA can provide a large surface area to volume ratio and facilitate attachment of the oppositely charged particles (i.e., MEA) to their outer surfaces by coulombic forces. The smaller sized CGA bubbles also exhibit high stability. However, additional increases in the stirring speed, up to 24,000 rpm, resulted in a decrease in the emission reduction of MEA. This is primarily due to the larger bubble sizes created at this stirring speed resulting in a visibly higher amount of bubble coalescing and breakage. Based on MEA emission reduction, it was found that 18,000 rpm was the optimal stirring speed for CGA generation (FIG. 5).

3.2.2 Effect of the Surfactant Concentration

Figure 6:
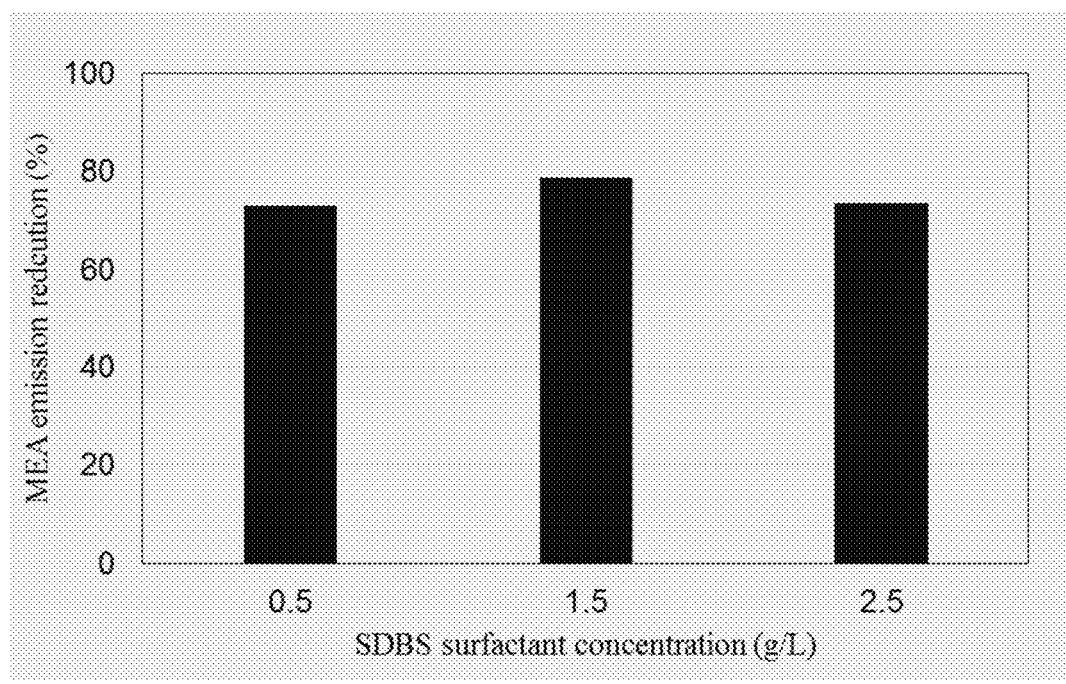
FIG. 6 shows the effect of SDBS concentration on MEA emission reduction.
Figure 7:
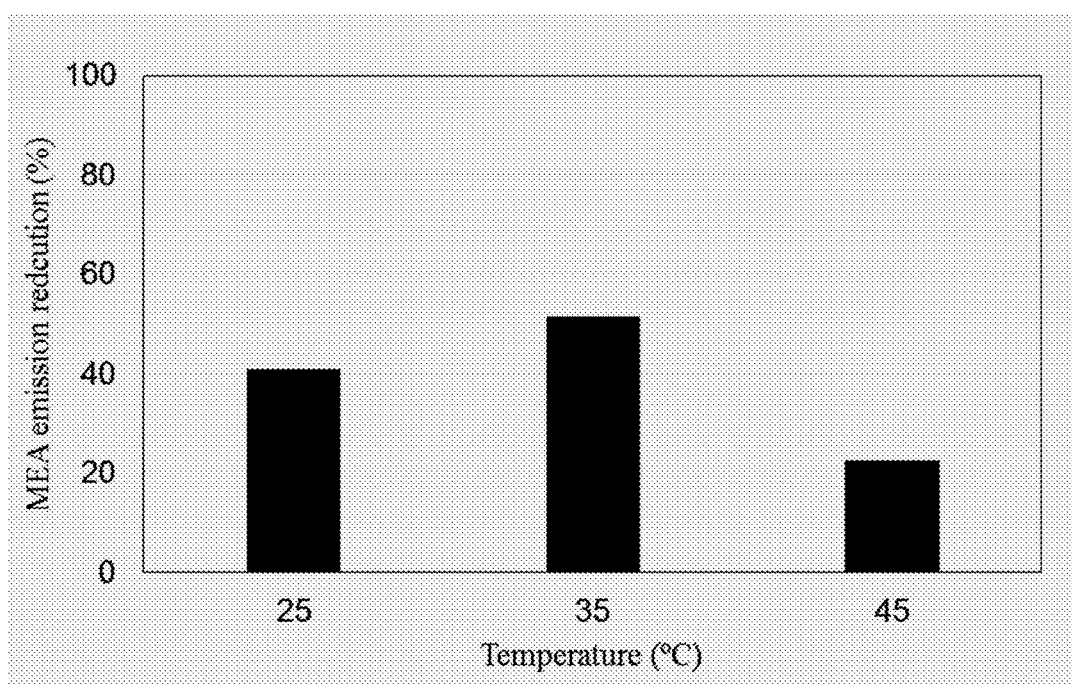
FIG. 7 shows the effect of temperature on MEA emission reduction.
Figure 8:
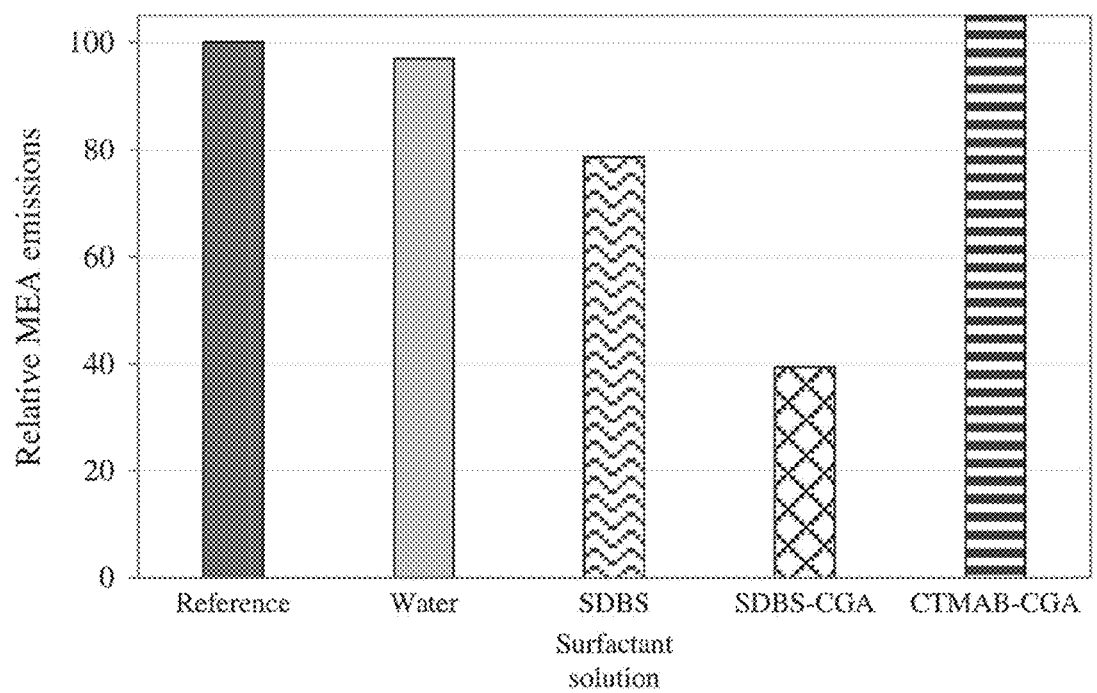
FIG. 8 shows the effect of different capture medium on relative MEA emissions.
Figure 9:
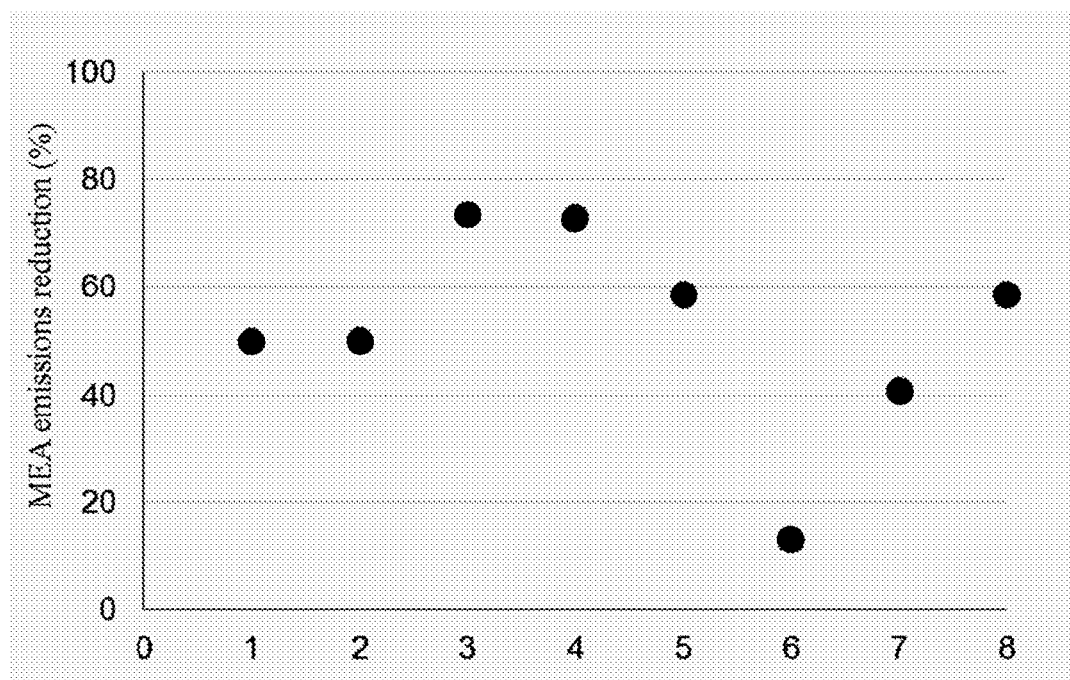
FIG. 9 shows MEA emission reduction in the $CO_2$ capture pilot using the CGA capture and elimination system over repeated courses.
Figure 10:
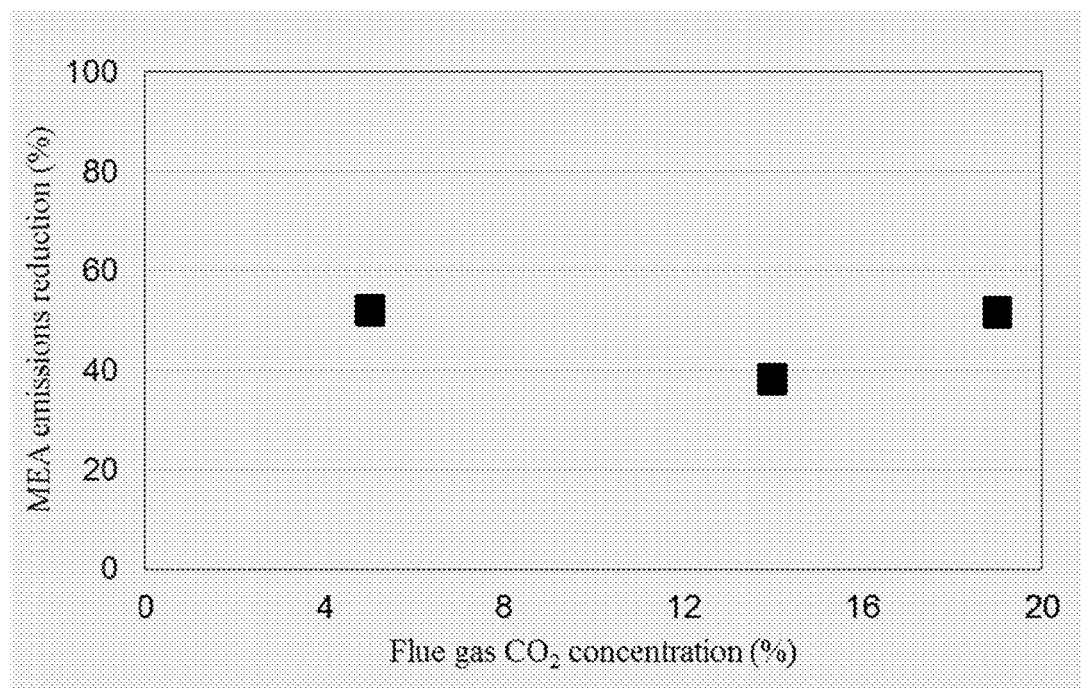
FIG. 10 shows the effect of $CO_2$ concentration on MEA emission reduction.

An increase in the surfactant concentration can result in a larger amount of CGA bubble number, higher bubble stability, smaller bubble sizes and larger interfacial areas [Dermiki et al., Sep. Purif. Technol. 65 (2009) 54-64]. When the mean size of charged CGA bubbles is sufficiently small, the resulting CGA bubble will have high specific surface area with the capability of capturing more analyte droplets. However, when the concentration is too high and too many bubbles are formed they can overlap with each other leading to an increase in the interfacial area resulting in the CGA bubbles rising more quickly in the capture cell thereby decreasing the contact time between the mist droplet and CGA. The decrease in contact time can lead to lower probability for collisions and capturing mist droplets. As shown in FIG. 6, the relative capture efficiency was not significantly different at the three SDBS concentrations tested. At the 2.5 g/L concentration level, there was visual evidence of larger bubble formation, bubble coalescing and bubbles rising fast within the capture cell, although this did not appear to significantly impact capture efficiency, it could lead to decreased capture performance at higher concentration levels. Given the potential for problems at concentration levels above 2.5 g/L, all further testing was performed using 1.5 g/L of surfactant generate the CGA.

3.2.3 Effect of the Temperature on CGA Emission Reduction

The kinetic energy of the amine mist droplets and CGA should increase with higher temperatures, resulting in a higher probability of collisions between the mist droplet and CGA. However, the higher temperatures also result in a higher MEA vapor pressure causing evaporation from the liquid phase (mist droplets) into gas phase for potential emission. The temperature of the capture cell can also influence the stability of CGA impacting the system capture capacity. Likewise, the liquid film of the surfactant solution may not be strong enough to sustain the CGA bubbles when the temperature rises, leading to instability and reduced capture capacity of the CGA bubbles. As shown in FIG. 7, the MEA emission reduction by the CGA was somewhat similar at the three temperature (25° C., 35° C., 45° C.) with no identifiable trend observed. The ambient temperature near the top of the absorber where the CGA capture and elimination apparatus was installed is usually around 25° C. during normal operation, while the average flue gas temperature at the absorber exit is usually close to 45° C. Since the different capture cell temperature tested did not yield a clear optimal temperature in the range between the flue gas temperature and the ambient temperature where the CGA capture and elimination system was located, the remaining testing was conducted at ambient condition with an average recorded temperature of 25° C.

3.2.4 Effect of the Capture Medium

The capture and removal of MEA from a gas stream can potentially occur with different mediums from various mechanism including electrical forces, dissolution and/or diffusion. In order to better understand the capture mechanism for MEA from the pilot CO2 capture operation, several potential capture mediums were evaluated in the CGA capture and elimination apparatus. First, the capture cell was filled with water (similar to a single stage water wash) to the normal operating liquid level and the flue gas was flowed through the cell at the same rate and for the same time duration as with the CGA capture and elimination experiments. Next, the capture cell was filled with a solution of 1.5 g/L SDBS, but without generating the CGA in the generation cell, and again the flue gas flowed through the cell at the same rate and for the same time duration as with the CGA capture and elimination experiments. Lastly, CGA were generated from the anionic surfactant SDBS and the cationic surfactant CTMAB. A reference emission sample was collected in parallel with all experiments to serve as a control for the variable emission levels from the pilot unit.

As can be seen in FIG. 8, the emission levels with the SDBS solution, and more specifically the CGA, were significantly lower than with only water in the capture cell. The CGA generated from the cationic CTMAB was completely ineffective at reducing MEA mist emissions. This suggests that the MEA adsorption might be occurring through an collision and electrostatic attachment type mechanism where the capture is enhanced by the electrostatic interactions of the hydrolyzed MEA to the negatively charged anionic CGA. In addition, the aqueous SDBS-CGA solution also appears to be additive, where it takes advantage of several capture mechanisms including dissolution it the water, and dissolution and diffusion with the water and surfactant in addition to collisions and electrostatic attachment.

3.3 MEA Emission Reduction in the CAER CO2 Capture Pilot

After optimizing the CGA capture method parameters, a series of samples were collected over the course of several weeks to evaluate the CGA capture and elimination system during a variety of different pilot operating conditions. As mentioned earlier, the CAER pilot was performing parametric solvent testing during this time period which included different liquid to gas ratios in the absorber, different stripper pressures and different inlet gas compositions. FIG. 9 shows the MEA emission reduction by the CGA system during eight separate sampling days. The average emission reduction was near 52%, with a high of 87% and a low of 27%. In all cases, the MEA emission level after the CGA system was reduced relative to the reference MEA emission levels.

3.4 Effect of Variable Pilot Inlet $CO_2$ Concentration

Concentrations of the $CO_2$ in power station flue gas can range from around 4% by volume for natural gas combined cycle plants, to 14% for coal-fired power plants, to 19% for oil-fired power plant. Lower $CO_2$ concentrations in the flue gas will lead to lower $CO_2$ loadings in the solvent which should increase the amount of amine in the gas phase (at a given temperature) leading to a higher amine concentration in the mist droplets[Fulk et al., Energy Procedia 37 (2013) 1706-1719]. In order to investigate the effect of CO2 concentration entering into absorber on the MEA mist emissions and the suitability of the CGA capture process, experiments were conducted with $CO_2$ concentrations at 3 different levels. As shown in FIG. 10, the emission level of MEA using the CGA capture process is lower (relative to the reference emission level) at all three different $CO_2$ concentration conditions tested.

Additionally, the MEA emission levels from the $CO_2$ capture pilot was not significantly different at the three $CO_2$ inlet concentration tested. The results suggests that the $CO_2$ level in the gas phase, and subsequent $CO_2$ loading in the solvent, may not be the primary driving force for amine mist formation and growth in the CAER pilot system. However, the CGA system has shown the flexibility to be used in a variety of different system/application when the inlet $CO_2$ levels vary between 5-19%, or where the $CO_2$ in the flue gas is unstable or varies due to changes in the gas source entering the $CO_2$ capture unit.

3.5 Parallel Ammonia Emission Reduction

Figure 11:
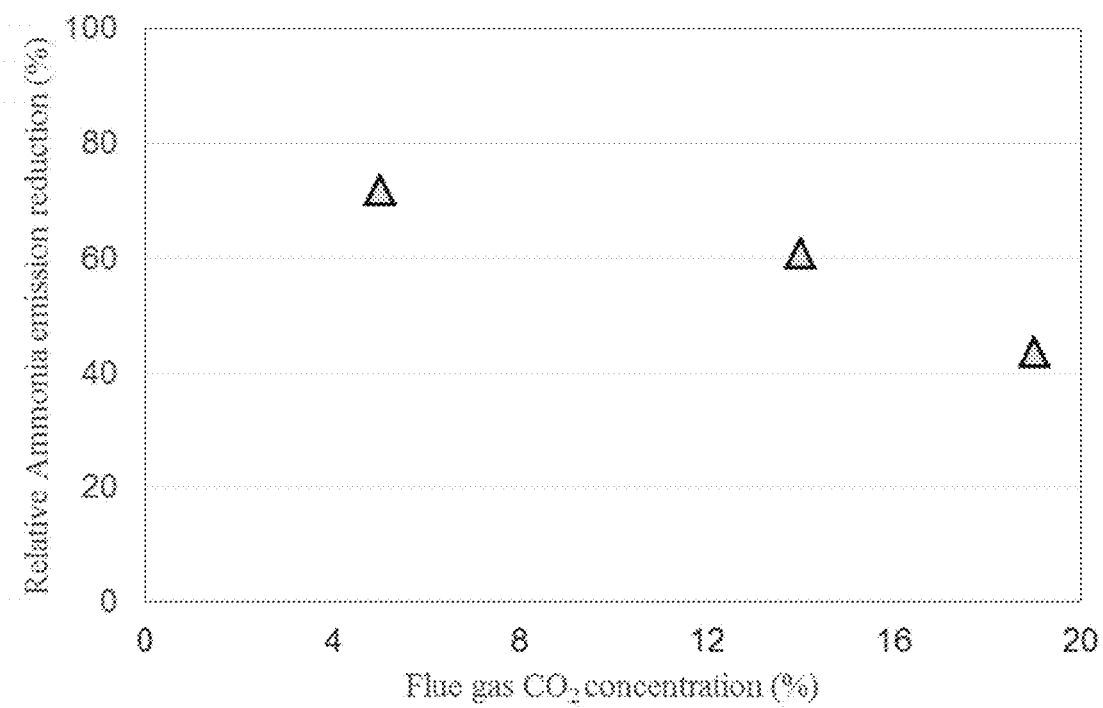
FIG. 11 shows the effect of $CO_2$ concentration on ammonia emission reduction.

Aqueous ammonia is widely used for the chemical absorption of $CO_2$. The aqueous ammonia has advantages of high $CO_2$ loading capacity, no absorbent degradation, and low energy requirement [Liu et al., Chem. Eng. Sci. 75 (2012) 298-308; Zhang et al., Int. J. Greenhouse. Gas Con. 16 (2013) 61-71]. It may also be necessary to reduce or remove ammonia droplets from gas streams in the chemical absorption of CO2 process using aqueous ammonia absorbent. In addition, ammonia is a common degradation product from aqueous amine based carbon capture systems due to the combination of high temperatures stripper column and dissolved oxygen in the aqueous amine used as the capture reagent. As shown in FIG. 11, the emission concentration of ammonia using the process of CGA capture is also lower than the reference emission level at all three different $CO_2$ concentration conditions tested showing the potential to us the CGA capture and elimination system to reduce ammonia emission, in addition to MEA mist emissions, in $CO_2$ capture systems.

4 Conclusions

A novel capture system using charged colloidal gas aphrons was developed to reduce the emissions of MEA mist produced in the process $CO_2$ capture. The results show that the emission of fine MEA droplets from flue gas steam can be significantly reduced using CGA generated from the anionic surfactant SDBS. The pH value of surfactant solution for generating charged CGA had no significant effect on properties of charged bubbles, such as the mean size, stability and viscosity. The stable charged micro bubbles can be generated at the expected operational pH values. The removal of MEA, and ammonia, from the flue gas steam of a pilot scale $CO_2$ capture unit using coal combustion flue gas was achieved under the conditions that favor electrostatic interactions. Additionally, when compared to a conventional style water wash and surfactant solution, the SDBS-CGA system appear to have higher MEA emission reduction efficiency and the potential for the large scale reduction of mist emissions produced in the absorber column of a $CO_2$ capture system using aqueous amine solvents.

Example 2

During $CO_2$ capture processes from coal-derived flue gas with amine solvents small entrain small solvent droplets can be formed and emitted from the system leading to high solvent emission levels. The entrained mist will lead to significant solvent make-up rates and the associated costs and may have significant secondary environmental impacts. In order to combat this issue and reduce the emissions of amine mist droplets from $CO_2$ absorber, a novel method using an anionic surfactant to generate charged colloidal gas aphrons (CGA) was developed. MEA emission reduction through a CGA absorption process was optimized by adjusting variables including capture temperature and stirring speed of the CGA generator. A significant reduction of close to 50% in MEA emissions in the flue gas stream exiting the absorber column was achieved from a pilot scale $CO_2$ capture pilot unit.

The capture and control of $CO_2$ from major industries such as cement and steel mills, and coal fired power plants is considered the most effective solution in tackling climate change caused by $CO_2$ accumulation in the atmosphere. Among the common capture approaches, chemical absorption and desorption is perhaps the most promising option for separating $CO_2$ from fossil-fuel flue gas due to its simple operation, high absorption efficiency, cost-effectiveness and technological maturity and be emitted from the system. These entrained droplets, or mist, can lead to significant solvent losses during the $CO_2$ capture process and [Fulk et al., Energy Procedia 2013; 37:1706-19]. From a process and economic standpoint it is important to reduce or eliminate amine solvent emissions from the outlet gas streams. Reducing or eliminating solvent emissions can have several important benefits including: (a) reduced loss of valuable solvent, (b) elimination of fugitive emission, and (c) reduction in negative environmental impacts [Austrheim et al., Chem Eng J 2008; 138:95-102].

There are several commercially available mist reduction systems such as vane mist eliminators, mesh mist eliminator, and cyclone based systems. However at present, a mist elimination process has yet to be developed specifically for incorporation into amine based carbon capture systems. One new approach to reduce or eliminate amine mist emissions from carbon capture system is using a surfactant-based separation technique by generating charged colloidal gas aphrons (CGA) [Austrheim et al., Fuel 2008; 87:1281-8]. CGA micro-bubbles form a double layer of surfactant molecules with a thin surfactant film encapsulating the trapped gas core [Sebba et al., J Colloid Interf Sci 1972; 40:468-474; Save et al., Chem Eng Commun 1994; 127:35-54; Jauregi et al., AlChE J. 2000; 46:24-36]. The adsorption selectivity of the CGA micro-bubbles can be varied by selecting an alternative surfactant such as cationic, anionic or non-ionic. The outer surface of the CGA micro-bubble will become positively, negatively or non-charged respectively, to which oppositely or noncharged molecules can be adsorbed onto the surface [Dai et al., J Colloid Interf Sci 2003; 261:360-5].

The application of CGAs is increasing in recent years due to the unique and variable characteristics the microbubbles can possess including having a relatively large surface area, low viscosity and high bubble stability. CGA have been previously used in wastewater treatment and the removal of toxic wastes from soil and for flotation separation processes [Dermiki et al., Sep Purif Technol 2009; 65:54-64; Waters et al., Miner Eng 2008; 21:918-923; Hashim et al., Bioresource Technol 1998; 64:199-204; Mansur et al., Sep Purif Technol 2005; 48:71-7]. However, the application of CGA for amine mist emission reduction has not yet been explored to date. The primary objective of this study was to evaluate the performance of CGA micro-bubbles to reduce MEA mist emissions from a pilot scale $CO_2$ capture process.

2. Experimental Methods 2.1. $CO_2$ Capture Pilot Operating Conditions

A 0.1 MWth pilot-scale $CO_2$ capture facility with a coal-fired flue gas generator (FGG) was utilized. The $CO_2$ capture facility consists of a 7.3 m (24 ft) tall by 10 cm (4") ID scrubber with a 25.4 cm (10") ID solvent recovery column downstream, a 4.3 m (14-ft) tall stainless steel stripper, and a condenser for solvent recovery in the stripper exhaust. The FGG is a coal combustion system designed to deliver flue gas to the $CO_2$ capture pilot plant with a thermal design capacity of 200,000 Btu/hr. Flue gas exiting the combustor enters a high-temperature cyclone to remove particulate matter. After the cyclone, the $SO_2$ concentration is lowered in the gas stream with a wet flue gas desulphurization (WFGD) unit. Additional pilot information can be found in Frimpong et al. [Frimpong et al., Chem Eng Res Des 2013; 6:963-9]. The amine solvent used in the current test campaign was aqueous 30% wt monoethanolamine (MEA). The average gas conditions are as follows: 14% $CO2$, 8% $O2$ and 70-100 ppm $SO2$.

2.2. CGA Capture System

The CGA generation and capture apparatus includes a disperser inside a generation cell, a peristaltic pump and a capture cell. The disperser consists of a homogenizer (model: Pow Gen 500, 115V) and a sawtooth generator (model: 10°-195 mm), driven by a high-speed electric motor. The generation cell is made of plexiglass with an internal diameter of 8 inches and a height of 10 inches. The capture cell is also made of plexiglass with a diameter of 8 inches and height of 12 inches. The CGA experimental apparatus schematic is shown in FIG. 2.

Figure 13:
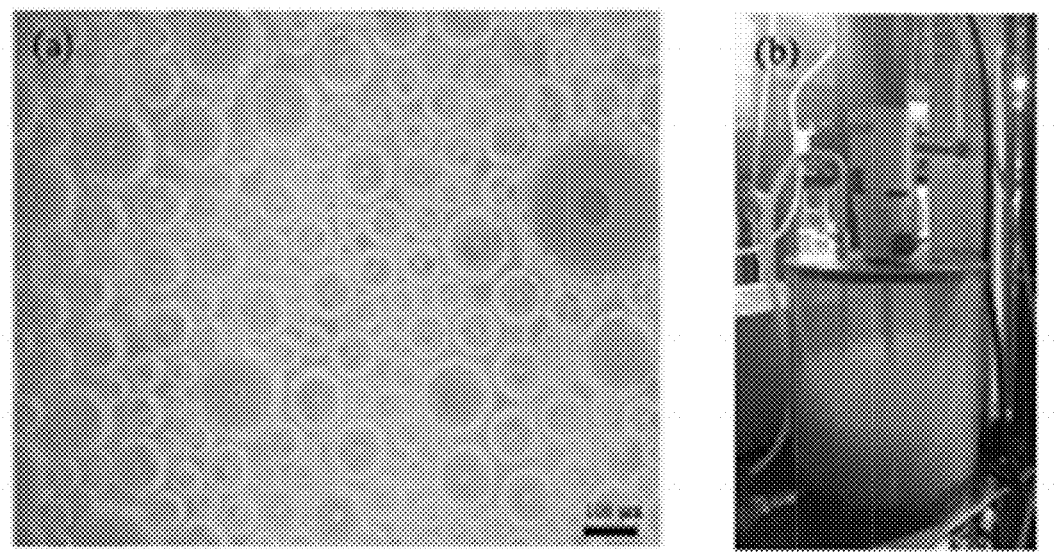
FIG. 13 shows (a) CGA micro-bubbles (100× electron microscope image); (b) CGA generating cell.

Commercially available surfactants were used to generate the CGA micro-bubbles. The CGA (FIG. 13a) were generated with 1 L distilled water and a measured amount of the surfactant with stirring speeds in excess of 6000 rpm in the generating cell (FIG. 13b). The CGA were then pumped into the adsorbing cell by a peristaltic pump through an emulsion tube.

The capture process works in a counter-current fashion in the adsorbing cell where the flue gas was introduced at the bottom through a tube with a diameter of ¼ inches. The flue gas exits the elimination cell before entering the gas sampling apparatus. The temperature of the capture cell was adjusted by placing it into a temperature controlled water bath. The adsorption of the droplets by the charged CGA micro-bubbles is believed to be through a collision and attachment type mechanism as shown in FIG. 3.

2.3. MEA Emissions from $CO_2$ Absorber Column

MEA emissions were measured after the $CO_2$ absorber column in the flue gas exit line. The gas sampling apparatus consisted of a sampling console with a dry gas pump connected to a 4-impinger sampling train in an ice bath containing 0.05 M sulfuric acid, along with an inline binder-free quartz filter to keep coal fly ash from entering the mpinge train. Sulfuric acid is used to absorb the basic ammonia and MEA emitted in the gas stream exiting the absorber column. The sampling lines were not heated (ambient conditions) during the sample collection period.

The MEA emission reduction efficiency of the CGA system was evaluated during a 30% (wt) MEA solvent test campaign in the CAER pilot $CO_2$ capture unit. During CGA testing, a control (reference) gas sample was collected from a sampling port location before the CGA capture apparatus at the same time as a gas sample was collected after the CGA apparatus. The reference sample was used to evaluate the reduction in emissions and to normalize the results (representing % MEA emission reduction) for comparison purposes. The collected immpinger sulfuric acid samples were diluted 10 times and analyzed by cation ion chromatography using a Dionex ICS-3000 system (Dionex-ThermoScientific Sunnyvale, Calif.) with an autosampler. The cation IC system consisted of an CSRS 300 suppressor, EGC III MSA (methanesulfonic acid) eluent generator, IonPac CS17 analytical column and an CG17 guard column operated at 30° C. The conductivity detector was maintained at 35° C. with a sample injection volume of 20 μL. An isocratic mobile phase of methanesulfonic acid (2.5 mM) at a flow rate of 0.8 mL/min was used. MEA quantitation was performed using a calibration curve from pure MEA (+99%, Alfa Aesar, Ward Hill, Mass.) standards.

3. Results and Discussion 3.1. Effect of Stirring Speed on CGA Bubble Generation The stirring speed of the surfactant solution is a major operating variable for generating CGA micro-bubbles. Slower speeds may lead to an insufficient amount of micro bubbles generated, while higher speeds can cause excessive foaming and large unstable bubbles. This trade-off can be attributed to the variable energy input, with a higher input at higher stirring speed resulting in smaller bubbles and increased surface area. At relatively small sizes, the CGA bubbles have high stability and sufficient surface area to volume ratios and can facilitate attachment of the oppositely charged particles (i.e., MEA) to their surfaces by coulombic forces. However, further increasing the stirring speed can result in a higher amount of bubble coalescing and breakage, thereby diminishing their adsorption potential. A good compromise between these two competing issues was found at 18,000 rpm. This optimal stirring speed was used for all subsequent CGA experiments.

3.2. Effect of the Temperature on CGA Emission Reduction

At higher adsorption temperatures, the kinetic energy of the amine mist droplets and CGA should increase temperatures resulting in a slightly higher probability of mist droplet and CGA collisions. However, at higher temperatures the MEA will have a higher vapor pressure causing evaporation from the droplets into gas phase. Likewise, temperature can also influence the stability of CGA micro-bubbles. Therefore, the temperature of the capture cell can significantly influence the performance of the CGA capture system.

The CGA system was evaluated at three different temperatures corresponding to the ambient temperature near the top of the absorber where the CGA system apparatus was installed (25° C.), the average flue gas temperature at the absorber exit (45° C.) and at a temperature in between these two values (35° C.). In this test no identifiable temperature trend was observed, therefore the remaining CGA capture testing was conducted with an average recorded temperature of 25° C. in the adsorbing cell.

3.3. MEA Emission Reduction in the Pilot

In order to investigate MEA adsorption and capture by CGA micro-bubbles system, a series of samples were collected over the course of several weeks during normal operating conditions in the pilot $CO_2$ capture unit. First, the capture potential of water (as an experimental apparatus blank) was evaluated by filling the adsorption cell with 1 L of water while the flue gas flowed through the cell at the same rate and for the same time duration as with the CGA capture experiments. Next, the capture cell was filled with a solution of surfactant, but without generating the CGA in the generation cell, and again the flue gas flowed through the cell at the same rate and for the same time duration as with the CGA capture and elimination experiments. Lastly, CGA were generated from a surfactant solution on the generation cell and pumped into the adsorption cell while the flue gas flowed upward through the CGA micro-bubble solution. The MEA emissions from the CGA adsorption cell were measured during each experiment. As previously mentioned, an absorber MEA emission sample was collected in parallel with all experiments to serve as a reference from the pilot unit to evaluate MEA emission reduction by the CGA system.

Figure 15:
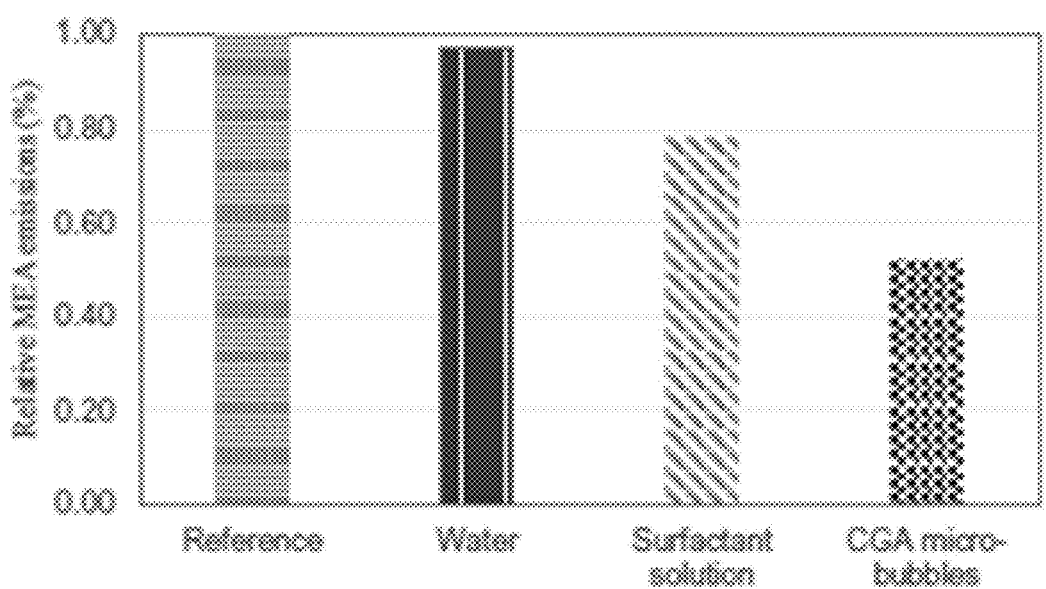
FIG. 15 shows relative MEA emissions from $CO_2$ pilot unit during CGA system testing.

FIG. 15 shows the MEA emission reduction with the different capture medium; water, surfactant solution and CGA micro-bubbles. The emission level with the water, similar to a water wash, was very low at near 3%. The surfactant solution alone was able to show a small (22%) but definite reduction in MEA emissions. This can likely be traced to the generation of some charged bubbles as the flue gas flowed through the solution. The amount and size of the generated bubble was not analyzed in this work. Lastly, the CGA micro-bubbles showed a significantly lower emission level with a reduction of near 48%, relative to the reference MEA emission levels. This suggests that when compared to water alone, the MEA capture is enhanced by the electrostatic interactions of the MEA with the charged CGA micro-bubble. As suggested earlier, the adsorption of the MEA droplets is believed to be through a collision and electrostatic attachment type mechanism with the charged micro-bubble. However, the exact mechanism has not been experimentally verified and will be investigated as part of future experiments.

4. Conclusions

A new fine mist/droplet capture system using charged colloidal gas aphrons was developed to reduce amine solvent emissions from a $CO_2$ capture system. The initial results suggest that fine MEA droplet emissions in the gas steam exiting the absorber column can be reduced using charged micro-bubble CGAs. Additionally, when compared to a conventional style water wash, the CGA system appears to have greater MEA emission reduction capabilities and the potential for larger scale reductions with further optimization. This system can potentially be applied mist emissions reduction in larger CO2 capture systems that use aqueous amine as the CO2 capture solvent.

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention. All publications, patents and patent applications referenced herein are to be each individually considered to be incorporated by reference in their entirety.

The invention claimed is:

1. A system for removing amine solvents from a carbon capture flue gas comprising:
    a generator cell comprising a disperser and a measure of surfactant in a solution to generate colloidal gas aphrons (CGAs), the disperser comprising a homogenizer with a high speed motor;
    a capture cell comprising an amine solvent and an inlet for CGAs and an outlet for flue gas at a first end of the capture cell, the inlet for CGAs being connected to the disperser through a pump, and an outlet for CGAs and an inlet for flue gas at a second opposite end of the capture cell, such that CGAs flow as a counter current to flue gas; and
    an eliminator cell with an inlet port to receive entrained CGAs and flue gas from the outlet for flue gas from the capture cell, the eliminator cell comprising a liquid trap.

2. The system of claim 1, wherein the surfactant is selected from the group consisting of SDS (sodium dodecyl sulfate), SDBS (sodium dodecyl benzene sulfonate), AOT (sodium bis (2-ethyl hexyl) sulfosuccinate), SLS (sodium lauryl sulfate), potassium oleate, Aerosol OT, LUX flakes, Benzethonium chloride, hexadecyltrimethylammonium bromide (CTMAB) or mixtures thereof.

3. The system of claim 2, wherein the surfactant is selected from sodium dodecylbenzene sulfonate (SDBS) and hexadecyltrimethylammonium bromide (CTMAB).

4. The system of claim 2, wherein the surfactant is SDBS.

5. The system of claim 1, wherein the capture cell is maintained at a temperature of between 10-90° C.

6. The system of claim 1, wherein the capture cell is maintained at a temperature of between 25-45° C.

7. The system of claim 1, wherein the surfactant is present in the generator cell at a concentration of between 0.1 and 10.0 g/L.

8. The system of claim 7, wherein the surfactant is present in the generator cell at a concentration of 1.5 g/L.

9. The system of claim 1, wherein the disperser rotates at between 2000 and 20000 revolutions per minute to generate CGAs.

10. The system of claim 9, wherein the disperser rotates at about 18000 revolutions per minute (rpm) to generate CGAs.

11. The system of claim 1, wherein the medium of the capture cell is SDBS CGA.

12. The system of claim 1, wherein the capture cell provides for flow of flue gas to be counter to flow of CGAs from the inlet for CGAs.

* * * * *